(12) United States Patent
Anantha Padmanaban et al.

(10) Patent No.: US 8,751,711 B2
(45) Date of Patent: Jun. 10, 2014

(54) STORAGE TOPOLOGY MANAGER

(75) Inventors: Sai Sudhir Anantha Padmanaban, Redmond, WA (US); Andrea D'Amato, Kirkland, WA (US); Alan Warwick, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 198 days.

(21) Appl. No.: 12/972,010

(22) Filed: Dec. 17, 2010

(65) Prior Publication Data

US 2012/0159021 A1   Jun. 21, 2012

(51) Int. Cl.
*G06F 3/00* (2006.01)
*G06F 5/00* (2006.01)
*G06F 13/38* (2006.01)

(52) U.S. Cl.
USPC .................................. 710/74; 710/38; 710/15

(58) Field of Classification Search
None
See application file for complete search history.

(56) References Cited

U.S. PATENT DOCUMENTS

| | | |
|---|---|---|
| 6,314,460 B1 | 11/2001 | Knight |
| 7,046,639 B2 | 5/2006 | Garcia-Luna-Aceves |
| 7,089,281 B1 * | 8/2006 | Kazemi et al. ............... 709/203 |
| 7,499,986 B2 | 3/2009 | Axberg |
| 7,630,877 B2 | 12/2009 | Brown |
| 8,019,840 B2 * | 9/2011 | McDougall et al. .......... 709/223 |
| 8,230,069 B2 * | 7/2012 | Korupolu ..................... 709/226 |

OTHER PUBLICATIONS

Gunho et al., "Topology-Aware Resource Allocation for Data-Intensive Workloads," 2010, http://conferences.sigcomm.org/sigcomm/2010/papers/apsys/p1.pdf.
Dearle et al., "A Flexible and Secure Deployment Framework for Distributed Applications," 2004, http://arxiv.org/ftp/arxiv/papers/1006/1006.4549.pdf.
Lee et al., "Resource and Topology Discovery for IP Multicast using a Fan-out Decrement Mechanism," 2002, http://users.ece.utexas.edu/~gustavo/papers/LeD01.pdf.
Dearle et al., "A Framework for Constraint-Based Deployment and Autonomic Management of Distributed Applications (Extended Abstract)," 2004, http://www.cs.st-andrews.ac.uk/files/publications/download/DKM04b.pdf.

* cited by examiner

*Primary Examiner* — Zachary K Huson
(74) *Attorney, Agent, or Firm* — Henry Gabryjelski; David Andrews; Micky Minhas

(57) ABSTRACT

Defining a storage topology of a distributed computing system including a set of machine nodes. A method includes dynamically receiving from a number of nodes in the distributed computing system information about storage devices. Each node sends information about storage devices connected to that particular node. The information is sent dynamically from each node as conditions related to storage change and as a result of conditions related to storage changing. From the received information, the method includes dynamically constructing a storage topology representation of the distributed computed system.

20 Claims, 3 Drawing Sheets

*300*

*302*
Dynamically Receiving From A Plurality Of Nodes In The Distributed Computing System Information About Storage Devices, Each Node Sending Information About Storage Devices Connected To That Particular Node, Wherein The Information Is Sent Dynamically From Each Node As Conditions Related To Storage Change And As A Result Of Conditions Related To Storage Changing

*304*
From The Received Information Dynamically Constructing A Storage Topology Representation Of The Distributed Computed System

STORAGE TOPOLOGY MANAGER

BACKGROUND

Background and Relevant Art

Computers and computing systems have affected nearly every aspect of modern living. Computers are generally involved in work, recreation, healthcare, transportation, entertainment, household management, etc.

Further, computing system functionality can be enhanced by a computing system's ability to be interconnected to other computing systems via network connections. Network connections may include, but are not limited to, connections via wired or wireless Ethernet, cellular connections, or even computer to computer connections through serial, parallel, USB, or other connections. The connections allow a computing system to access services at other computing systems and to quickly and efficiently receive application data from other computing system.

Computer systems may be interconnected to form a distributed system, where individual computer systems, or nodes, of the distributed system collaborate together to accomplish computing tasks. In a distributed system, a set of machines is configured to access the same shared storage devices represented by logical unit numbers (LUNs). Applications running in such a system depend on these LUNs and can be moved from one node to another providing high availability in the process. In some environments, such an application cannot be hosted on a machine that does not have access to the LUN. For example, one would not want to implement a failover to a node that cannot see the LUN. The topology of shared storage in such a system heavily influences the high availability of an application.

Shared storage can be symmetrical i.e. the same set of LUNs exposed to every machine in the distributed system or can be asymmetrical i.e. exposed to only a subset of machines.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method of defining a storage topology of a distributed computing system including a set of machine nodes. The method includes dynamically receiving from a number of nodes in the distributed computing system information about storage devices. Each node sends information about storage devices connected to that particular node. The information is sent dynamically from each node as conditions related to storage change and as a result of conditions related to storage changing. From the received information, the method includes dynamically constructing a storage topology representation of the distributed computer system.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Some embodiments implemented herein include functionality for dynamically constructing and maintaining a topology for shared storage devices (such as LUNs) in a distributed computing system. Information can be received from different nodes in the distributed system about storage available to the nodes. This information can be used to construct a topology. As conditions in the distributed computing system change, information about the changed conditions can be used to dynamically update the topology map.

Some embodiments may include functionality for calculating the topology of shared storage in a distributed environment. One such distributed environment may be implemented for enabling a failover cluster. The topology includes the connectivity information for each machine to each shared storage device of the shared storage. Topology updates may be dynamic. For example, the topology may be recalculated in response to notifications from a storage subsystem.

Embodiments may use the topology information to intelligently govern placement of applications that are dependent on the storage. For example, if a LUN is not exposed to a machine, an application like SQL or file server using that LUN may be prevented from starting on that node.

Embodiments may augment the topology information with other storage characteristics like path information, health of shared storage and asymmetrical configurations to present a global state of shared storage to administrators.

In summary, embodiments may calculate global shared storage topology and machine configuration and operating characteristics of a distributed set of machines by aggregating shared storage and machine information collected locally from each machine. The aggregated topology has storage connectivity and machine information for each machine in the set, thereby enabling application placement engines to dynamically govern on which machines applications are best chosen to run. The global topology is augmented with path information, storage characteristics (bus type, speed, etc) and exposes a rich API and notification interface to clients interested in understanding the shared storage topology.

Embodiments may use storage topology and machine information to drive dynamic placement of dependent applications. Embodiments may include functionality for calculation and presentation of a global topology for both symmetrical and asymmetrical storage configurations. For example, embodiments may be implemented where failover clustering presents each shared storage device as a physical disk resource that can be presented from only one machine. Embodiments may implement dynamic updates to the topology based on events generated from the storage subsystem. These updates can then be used to serve client APIs and notifications.

Figure 1:
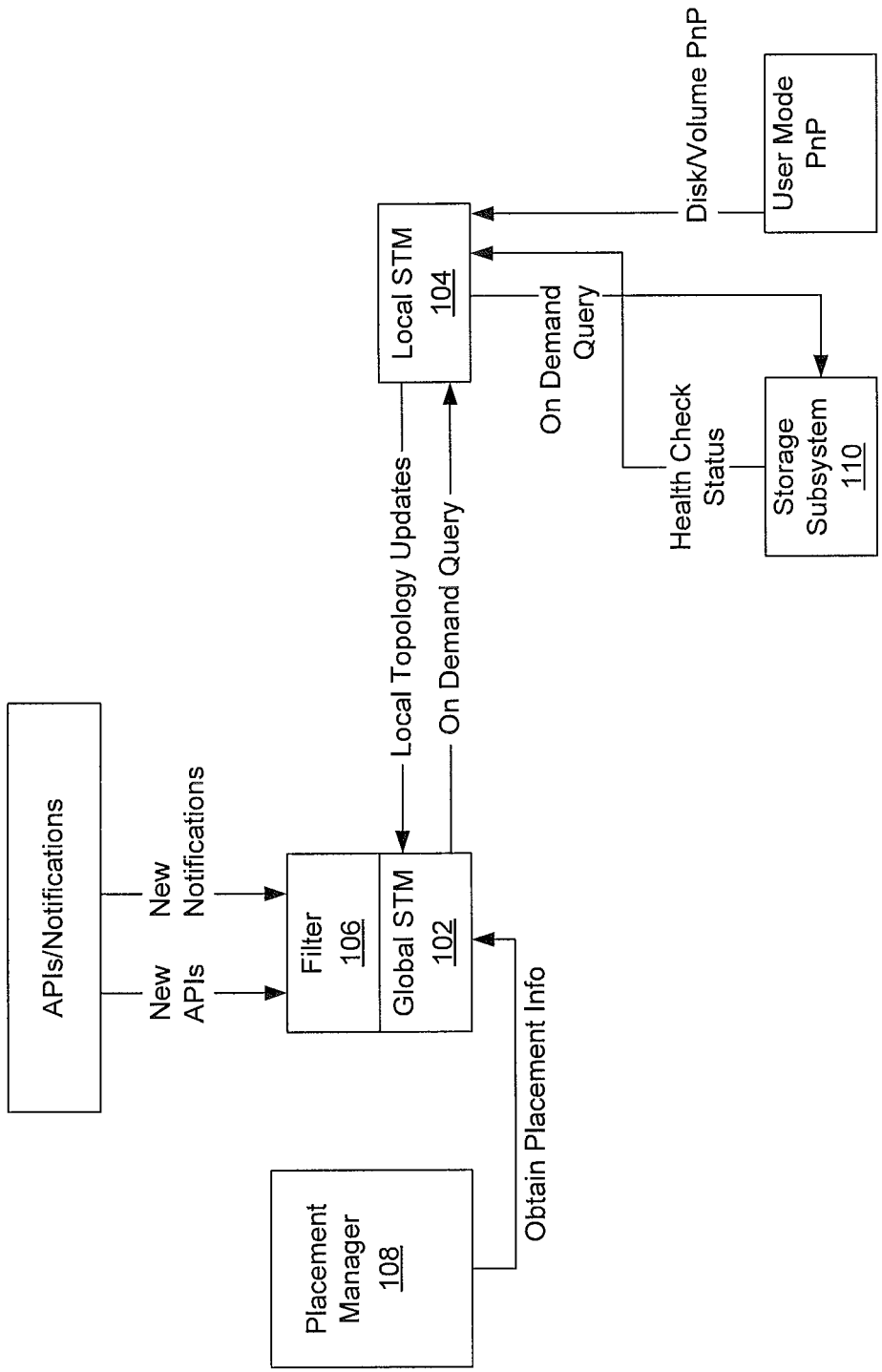
FIG. 1 illustrates an example storage topology management system.

A detailed example is now illustrated with reference to FIG. 1. Embodiments may implement a Storage Topology Manager (STM) which includes several different components. The STM is a distributed component that runs on machines in a distributed environment. One such distributed environment may be a Failover Cluster. The STM is broadly divided into two sub components, a global STM 102, and a local STM 104.

In some embodiments, the global STM 102 runs on one node in the distributed environment. While a node may also be referred to herein generally as a machine, and may be implemented as a single physical machine, it should be noted that embodiments may be implemented where a single node machine includes more than a single local physical machine. For example, some distributed computing systems may allow physical machines or components to work together as a single machine node.

The global STM 102 has at least three functionalities. First, the global STM 102 handles topology and machine node information aggregation. The global STM 102 is responsible for aggregation of topology from local storage information and machine node information such as the machine node configuration, machine node load, etc. collected from different machine nodes in a cluster. The global STM 102 can also apply filters, such as filter 106 on the global topology. For example the global STM 102 can filter out lists of shared storage devices that are not clusterable.

Second, the global STM 102 handles placement of applications. A distributed placement manager 108 queries the global topology and machine node information maintained by global STM 102 to place applications depending on a shared storage device on a specific machine node.

Third, the global STM 102 is an API Handler. The global STM 102 is responsible for serving client requests such as querying for topology and obtaining disk specific information.

The local STM 104 is an agent that runs on machine nodes of the cluster. In some embodiments, a local STM 104 may run on each node in the cluster or each node in the cluster except for the node that includes the global STM 102. The local STM 104 has at least two functionalities.

First, the local STM 104 has routines to query disk information and local machine node information on the local machine node on which the local STM 104 is located. It may also be registered with PnP for disk arrival/gone events. Disk arrival or departure on the local machine node triggers an update to be sent to the global STM 102 causing an update to the aggregated topology. In some embodiments, any disk arrival or departure on the local machine node triggers an approximately immediate update to be sent to the global STM 102

Second, the local STM 104 health checks the shared storage 110 coupled to a machine node hosting the local STM 104 and reports failures to global STM 102 so that the global STM 102 can update the global topology. Future application placement for an unhealthy shared storage device will not target the local machine node having the unhealthy shared storage device.

Figure 2:
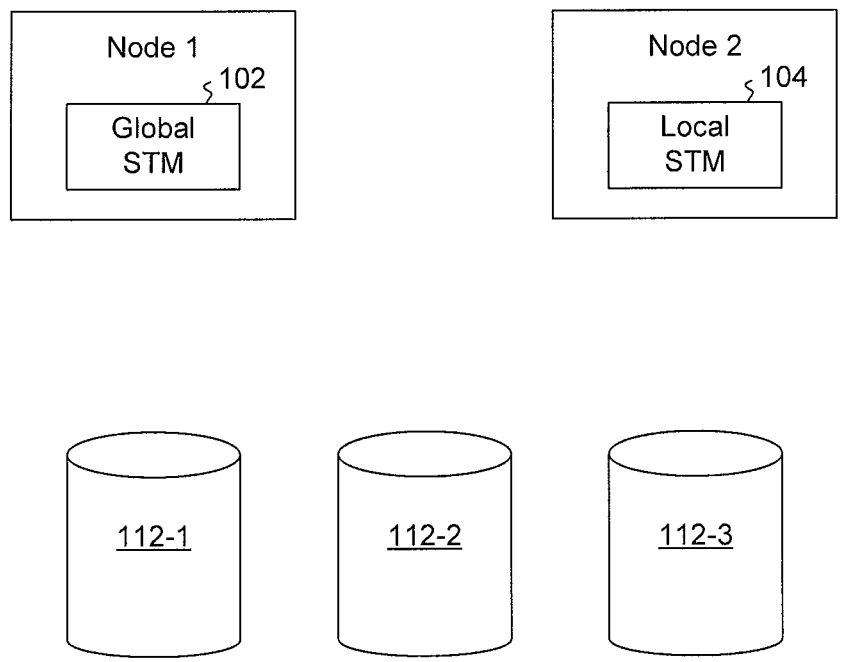
FIG. 2 illustrates an example of a storage topology.
Figure 3:
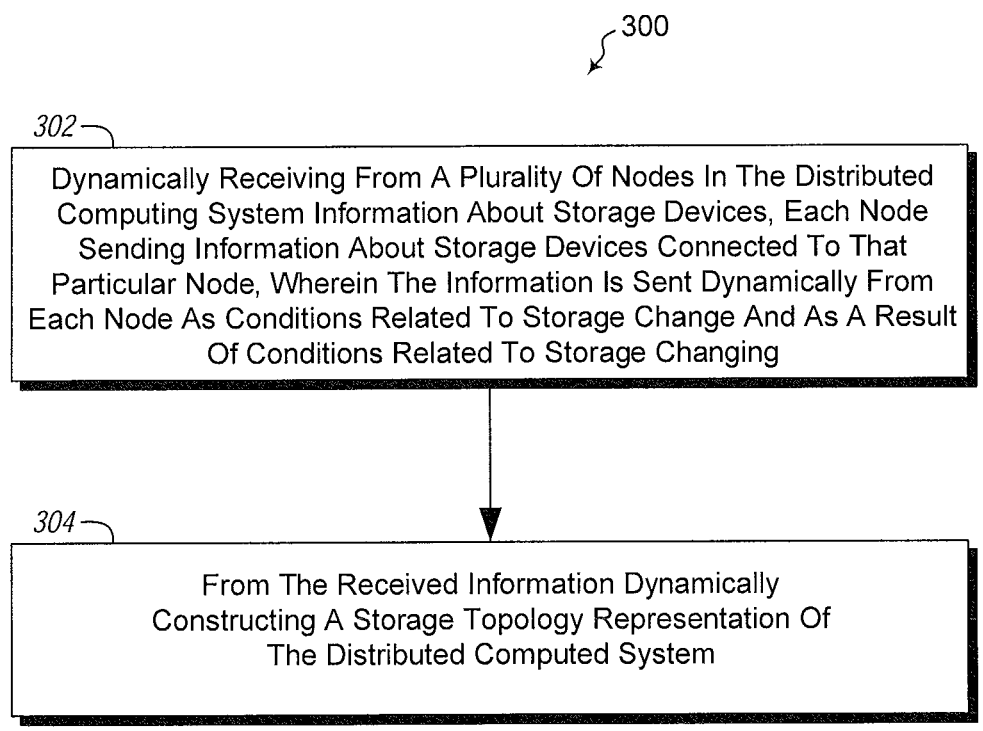
FIG. 3 illustrates a method of defining a storage topology.

The following, in conjunction with FIG. 2, illustrates an example STM startup in a distributed environment. A set of machine nodes (Node 1 and Node 2) connect to each other to form a cluster and designate one machine node to run global STM 102. This is the aggregator machine node. The machine nodes may designate a node in a number of different ways. For example, in one embodiment, each of the machine nodes may determine which node they can most quickly communicate with and may vote for that node. The node with the most votes becomes the node that runs the global STM 102. Alternatively, a random selection of a node may be made. Still other methods, though not enumerated here may be used to select the node to run the global STM 102.

Each machine node, using a local STM 104 queries its storage subsystem and machine node information locally and sends this information to the aggregator machine node to the global STM 102. In the Example illustrated in FIG. 2, Node 2 can see shared storage devices 112-2, and 112-3. Node 1 can see shared storage devices 112-1 and 112-2.

The aggregator of the global STM 102 runs an algorithm to match shared storage devices that have the same identification. The following illustrates an algorithm that may be used to match shared storage devices. This algorithm can be used to determine if two shared storage devices are the same or not. In one embodiment, an algorithm takes as input two STM shared storage device objects with shared storage device identification attributes on each. As an output, the algorithm outputs a logical "True" if the shared storage device identification is the same or a logical "False" if they are different. As noted, in the embodiment illustrated, the algorithm is executed at a machine running the Global STM 102. The algorithm is performed as follows in this very specific example:

Call the shared storage device identification of the STM shared storage device object1 as Id1.

Call the shared storage device identification of the STM shared storage device object2 as Id2.

For every identifier in Id1:
i) Skip the identifier if idType_ is not Vendor Id/EUI64/FCPH Name/SCSI Name String.
ii) Skip the identifier if idType_ of Id1 and idType_ of Id2 are not equal.
iii) Skip the identifier if idCodeSet_ of Id1 and idCodeSet_ of Id2 are not equal.
iv) Skip the identifier if the actual identifiers of Id1 and Id2 are not equal.

If at least one identifier matches as a result of steps (i-iv) above, return not unique, which causes a logical "True" to be returned for the algorithm. Otherwise, return unique which causes a logical "False" to be returned from the algorithm.

Once all of the shared storage devices have been identified for the nodes of the distributed system, the aggregator of the global STM 102 then constructs a connectivity matrix of which machine nodes can be seen by which shared storage devices. This includes information that will be used by a distributed placement manager 108 for placing applications. The following algorithm may be used in some embodiments to prepare a global view of an aggregated topology. As inputs, the algorithm may take a container of local shared storage devices received from machine nodes running in a distributed environment. As output, the algorithm may provide a container of STM global shared storage device objects representing the aggregated view of topology. The algorithm may be executed, in some embodiments, in the global STM 102. The algorithm includes initializing a global topology to empty. For each entry in the local shared storage devices container received from a machine node, an algorithm to match shared storage devices, such as that described above is run. If the algorithm returns unique, an entry is inserted into the global container along with the machine id of the machine node that sent the local shared storage device container. If the algorithm returns not unique, the visible machine list entry for that shared storage device is updated in the global container to include the machine node that sent the local shared storage device container.

The aggregator of the global STM 102 can further apply a filter 106 on the global topology. For example, one filter would be to maintain an enumeration of shared storage devices that can be used by a failover cluster.

Each machine node, using its local STM 104, may register for notifications from the storage subsystem and sends updates to the aggregator of the global STM 102 based on these notifications.

As part of the update sent to the aggregator at the global STM 102, the local machine node may also include other storage characteristics, path information and/or health status. In particular, a local machine node may send information through its local STM. Such information may include information about shared storage devices coupled to the local machine node, such as path information to access the shared storage. Such information may include health information if the local machine node knows that shared storage device are unhealthy in that they have malfunctions, long wait-times, poor communication links, etc. As noted, embodiments may implement a distributed placement manager 108 to make placement decisions about where to place applications. The distributed placement manager runs an algorithm when making a placement decision for an application depending on shared storage. The following illustrates one example of an algorithm that may be run. The algorithm includes acts to implement a query for a list of machines that can potentially host an application depending on shared storage. As input, the algorithm receives a container of shared storage devices aggregated by the global STM 102. As output, the algorithm provides a list of machines that can host the application. The algorithm, in the illustrated example, is executed at the distributed placement manager 108. The algorithm proceeds as follows: When application is ready to be started, a call is made into the global STM 102 to determine the list of potential host machines for that application. The global STM 102 returns the list of machines. The placement manager 108 applies its policies on top of the machine list based on other machine information and configuration to narrow down the application hosting machine to one or more nodes that could host the application. Machine information characteristics may include one or more of current application load, storage device performance, ability to multipath to storage device, storage device type and quality of service, configuration of required system services (such as file and print sharing), etc.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

One embodiment illustrated herein includes a method 300 of defining a storage topology of a distributed computing system including a set of machine nodes. The method 300 includes dynamically receiving from a number of nodes in the distributed computing system information about storage devices (act 302). Each node sends information about storage devices connected to that particular node. The information is sent dynamically from each node as conditions related to storage change and as a result of conditions related to storage changing. From the received information, the method includes dynamically constructing a storage topology representation of the distributed computed system (act 304).

The method 300 may be practiced where the information about storage devices includes information about a path from a node to the storage device. For example, a node may be able to provide information about the physical layer path that should be taken to access a storage device connected to the node.

The method 300 may be practiced where the information about storage devices includes information about speed of a storage device. For example, a node may be able to provide information about the speed characteristics of a storage device connected to the node. This may be determined by historical interaction with the storage device, by access to firmware on the storage device that defines the characteristics, etc.

The method 300 may be practiced where the information about storage devices includes information about health of a storage device. For example, a node may be able to provide information about the present functionality of a storage device connected to the node. This may be determined by interaction with the device, error messages from the device, user input, etc.

The method 300 may be practiced where the information about storage devices includes information about a bus type of a storage device. For example, a node may be able to provide information about the physical layer bus type (e.g. SCSI, USB, PCI-E, etc.) that is used to access a storage device connected to the node.

The method 300 may further include using the constructed topology representation, determining an appropriate node for a failover for one of the other nodes. In particular, by being able to determine storage device availability, an appropriate node for failover functionality can be defined. If certain storage devices are needed for failover functionality, then a determination can be made as to what nodes are connected to those storage devices. Those nodes can then be used as failover nodes.

The method 300 may further include using the constructed topology representation, determining an appropriate node for running an application based on the applications storage dependencies. In particular, by being able to determine storage device availability, an appropriate node for deploying an application can be defined. If certain storage devices are needed for certain applications, then a determination can be made as to what nodes are connected to those storage devices. Those nodes can then be used for application deployment.

The method 300 may further include selecting a global node from among nodes in the distributed computing system, and wherein the acts are performed by the global node. As noted above, a global node may be selected from among different nodes in the cluster. This may be accomplished by voting, random algorithms, etc.

The method 300 may further include filtering out non-clusterable storage devices such that they are not included in the topology representation. For example, even though a storage device may be connected to an appropriate node, the storage device may be non-clusterable such that it cannot be used by the various nodes of the cluster. These nodes can be filtered out of the topology representation such that they will not be used for making application deployment or fail-over node selection decisions.

Further, the methods may be practiced by a computer system including one or more processors and computer readable media such as computer memory. In particular, the computer memory may store computer executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer readable storage media and transmission computer readable media.

Physical computer readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer readable media to physical computer readable storage media (or vice versa). For example, computer-executable instructions or data structures received over a network or data link can be buffered in RAM within a network interface module (for example, a "NIC"), and then eventually transferred to computer system RAM and/or to less volatile computer readable physical storage media at a computer system. Thus, computer readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a distributed computing system comprising a storage topology and which includes one or more sets of machine nodes having access to one or more shared storage devices, a computer implemented method for dynamically re-defining the storage topology as conditions relating to one or more storage devices at one or more machine nodes change, the method comprising:

identifying at least one set of machine nodes having access to a plurality of shared storage devices;

installing at a first node of the set a global storage topology manager (STM);

installing at one or more other nodes of the set a local STM;

as conditions relating to one or more of the shared storage devices change, one or more of the local STMs sending information about the changed conditions to the global STM;

dynamically aggregating at the global STM the information received from the local STMs as the changed conditions occur; and from the aggregated information dynamically constructing at the global STM a storage topology representation of the distributed computed system which reflects the changed conditions, the storage topology representation comprising a topology map of the storage devices in the distributed system, the storage topology representation including path information indicating which nodes are connected to which of the plurality of shared storage devices and including type and speed information for each of the plurality of shared storage devices indicated as connected to each node;

wherein the storage topology representation is constructed by:

initializing a global topology to empty, for each entry in a local shared storage devices container received from a machine node, determining which of the each entries are unique, when an entry is unique, inserting the unique entry into a global container with a machine ID of a machine node that sent a local shared storage device container, and when an entry is not unique, updating an entry for that shared storage device in the global container to include a machine node that sent the local shared storage device container.

2. The method of claim 1, wherein the information relating to changed conditions about the one or more shared storage devices includes information about a path from a machine node in the set to one of the shared storage devices.

3. The method of claim 1, wherein the information relating to changed conditions about the one or more shared storage devices includes information about speed of one of the shared storage devices.

4. The method of claim 1, wherein the information relating to changed conditions about the one or more shared storage devices includes information about health of one of the shared storage devices.

5. The method of claim 1, wherein the information relating to changed conditions about the one or more shared storage devices includes information about a bus type of one of the shared storage devices.

6. The method of claim 1, further comprising using the constructed topology representation to determine an appropriate machine node in the set for a failover for one of the other machine nodes.

7. The method of claim 1, further comprising using the constructed topology representation to determine an appropriate machine node in the set for running an application based on the application's storage dependencies.

8. The method of claim 1, further comprising filtering out non-clusterable storage devices such that they are not included in the topology representation.

9. In a distributed computing system comprising a storage topology and which includes one or more sets of machine nodes having access to one or more shared storage devices, a physical computer readable storage medium comprising computer executable instructions that when executed by one or more processors cause a computer implemented method to be performed, where the computer implemented method dynamically re-defines the storage topology as conditions relating to one or more storage devices at one or more machine nodes change, the method comprising:

identifying at least one set of machine nodes having access to a plurality of shared storage devices;

installing at a first node of the set a global storage topology manager (STM);

installing at one or more other nodes of the set a local STM;

as conditions relating to one or more of the shared storage devices change, one or more of the local STMs sending information about the changed conditions to the global STM;

dynamically aggregating at the global STM the information received from the local STMs as the changed conditions occur; and from the aggregated information dynamically constructing at the global STM a storage topology representation of the distributed computed system which reflects the changed conditions, the storage topology representation comprising a topology map of the storage devices in the distributed system, the storage topology representation including path information indicating which nodes are connected to which of the plurality of shared storage devices and including type and speed information for each of the plurality of shared storage devices indicated as connected to each node;

wherein the storage topology representation is constructed by:

initializing a global topology to empty, for each entry in a local shared storage devices container received from a machine node, determining which of the each entries are unique, when an entry is unique, inserting the unique entry into a global container with a machine ID of a machine node that sent a local shared storage device container, and when an entry is not unique, updating an entry for that shared storage device in the global container to include a machine node that sent the local shared storage device container.

10. The computer readable medium of claim 9, wherein the information relating to changed conditions about the one or more shared storage devices includes information about a path from a machine node in the set to one of the shared storage devices.

11. The computer readable medium of claim 9, wherein the information relating to changed conditions about the one or more shared storage devices includes information about speed of one of the shared storage devices.

12. The computer readable medium of claim 9, wherein the information relating to changed conditions about the one or more shared storage devices includes information about health of one of the shared storage devices.

13. The computer readable medium of claim 9, wherein the information relating to changed conditions about the one or more shared storage devices includes information about a bus type of one of the shared storage devices.

14. The computer readable medium of claim 9, further comprising using the constructed topology representation to determine an appropriate machine node in the set for a failover for one of the other machine nodes.

15. The computer readable medium of claim 9, further comprising using the constructed topology representation to determine an appropriate machine node in the set for running an application based on the application's storage dependencies.

16. The computer readable medium of claim 9, further comprising filtering out non-clusterable storage devices such that they are not included in the topology representation.

17. A system for a dynamically re-configurable storage topology of a distributed computing system, comprising:

one or more clusters of machine nodes, where the machine nodes of each cluster have access to one or more shared storage devices;

for each cluster, a first node of the cluster comprising a global storage topology manager (STM); and for each cluster, one or more other nodes of the cluster comprising a local STM, and as conditions relating to one or more of the shared storage devices at the cluster change, one or more of the local STMs sending information about the changed conditions to the global STM, which dynamically aggregates the information received from the local STMs as the changed conditions occur, and from the aggregated information the global STM dynamically constructs a storage topology representation of the distributed computed system which reflects the changed conditions, the storage topology representation comprising a topology map of the storage devices in the distributed system, the storage topology representation including path information indicating which nodes are connected to which of the shared storage devices and including type and speed information for each of the shared storage devices indicated as connected to each node, wherein the storage topology representation is constructed by:

initializing a global topology to empty, for each entry in a local shared storage devices container received from a machine node, determining which of the each entries are unique, when an entry is unique, inserting the unique entry into a global container with a machine ID of a machine node that sent a local shared storage device container, when an entry is not unique, updating an entry for that shared storage device in the global container to include a machine node that sent the local shared storage device container.

18. A system as defined in claim 17 further comprising a placement manager component which queries the global STM to ascertain the dynamic storage topology and then handles placement of an application at a particular machine node based on the ascertained dynamic storage topology.

19. A system as defined in claim 17 wherein the global STM is configured to also serve client requests relating to queries for topology and obtaining disk specific information.

20. A system as defined in claim 17 wherein the global STM also applies one or more filters to the dynamic storage topology, and where at least one of the filters maintains an enumeration of shared storage devices that serve as a failover cluster.

* * * * *